No. 728,374. Patented May 19, 1903.

UNITED STATES PATENT OFFICE.

ADA DANMAR, OF JAMAICA, NEW YORK.

COMPOSITION FOR BLEACHING POTATOES.

SPECIFICATION forming part of Letters Patent No. 728,374, dated May 19, 1903.

Application filed June 17, 1902. Serial No. 112,049. (No specimens.)

*To all whom it may concern:*

Be it known that I, ADA DANMAR, a citizen of the United States of America, and a resident of Jamaica, in the county of Queens and State of New York, have invented a certain new and useful Composition of Matter for Culinary Purposes, of which the following is a specification.

My invention relates to a new and useful composition of matter to be used to prevent discoloration of food products when treated with heat, as in boiling.

My composition consists of the following ingredients: I take one of the class of double sulfates formed by the union of aluminium, chromium, or manganese sulfate with the sulfate of some other metal, commonly an alkaline metal or ammonium, denoted by the formula $Al_2(SO_4)_3+K_2SO_4+24H_2O$. I also take a compound of chlorin with the metallic base of the alkali soda denoted by the formula NaCl. These ingredients are thoroughly mixed, preferably by agitation, in the proportion preferably of approximately one part of the former to four to eight parts of the latter. To the above may be added, if desired, say, one part of a chemical compound belonging to the group of carbohydrates and classed as saccharose or glucose anhydrids, and I also sometimes add one to two parts of the proximate principle of plants having the formula $C_6H_{10}O_5$ or other cellulose body.

In using the above-named composition in cooking vegetables, and particularly for the purpose of neutralizing the stain from the soil, which causes potatoes to cook dark with the use of common salt, a heaping tablespoonful of my composition is used to each quart of water employed for cooking potatoes. The water should be warm and sufficient in quantity to cover the vegetables well, after which the same should be boiled slowly.

The above-named ingredients may be varied in proportion, and equivalent chemical reagents may be substituted for those named.

In some cases I use only chlorid of sodium and the sulfate of potash and alumina. In other cases I add to the above saccharose and cellulose bodies.

What I claim as my invention is—

1. The herein-described composition of matter for bleaching potatoes consisting of approximately one part of sulfate of potash and alumina, and five parts of chlorid of sodium, in combination with a saccharose body.

2. The herein-described composition of matter for preventing discoloration of food products when boiled consisting of sulfate of potash and alumina in combination with chlorid of sodium, and with saccharose and cellulose bodies.

In testimony of the foregoing specification I do hereby sign the same, in Jamaica, county of Queens, and State of New York, this 23d day of May, A. D. 1902.

ADA DANMAR.

Witnesses:
GEORGE J. DISTLER,
JAMES E. GALLAGHER.